United States Patent [19]

Frankl

[11] Patent Number: 4,592,275

[45] Date of Patent: Jun. 3, 1986

[54] METHOD AND APPARATUS FOR RECOVERY OF USEFUL FEED VALUES FROM ANIMAL WASTE

[76] Inventor: Gerald P. Frankl, 187 McCook Lake, Jefferson, S. Dak. 57038

[21] Appl. No.: 539,701

[22] Filed: Oct. 6, 1983

[51] Int. Cl.⁴ .......................... A01K 1/00; A23K 1/00
[52] U.S. Cl. ........................................ 99/495; 99/458; 209/254; 209/273; 210/433.1; 210/456
[58] Field of Search .................. 99/485, 495, 456–459; 71/21; 119/1, 16, 28, 22; 426/55, 431, 623, 630, 636, 807; 210/622, 623, 769, 513, 523, 408, 400, 514, 195.1, 456, 386, 433.1; 209/250, 273, 263, 262

[56] References Cited

U.S. PATENT DOCUMENTS

| 3,982,499 | 9/1976 | Frankl | 119/16 |
| 4,338,337 | 7/1982 | Frankl | 426/55 |

FOREIGN PATENT DOCUMENTS 2064292 6/1981 United Kingdom ............... 99/457

*Primary Examiner*—Timothy F. Simone

*Attorney, Agent, or Firm*—John E. Reilly

[57] ABSTRACT

A separator for reclaiming valuable nutrients not digested by livestock has an inclined bed with closely spaced slots therein and delivery means for a mixture of liquid and solid animal waste material to the bed's upper part for gravity flow along the inclined surface of the bed. The slots are spaced for removal of liquid from the mixture while at the same time preventing the passage of solids. A traveling spray head is positioned over the bed's inclined surface and periodically advanced therealong to clean the screen and remove any solid particles from the slots. A flexible sheet overlies the bed and has means suspending the upper end of the sheet in predetermined spaced relation to the bed to form a delivery entrance for the mixture downwardly between the sheet and bed. The separated liquid is carried into a treatment pond, and the solid material taken off the screen's lower discharge end is advanced into a screw feed conveyor for removal of additional moisture. A vertical conveyor delivers the solid material into a separate batch mixer where the solids are mixed into a ration with suitable feed supplements for livestock.

12 Claims, 5 Drawing Figures

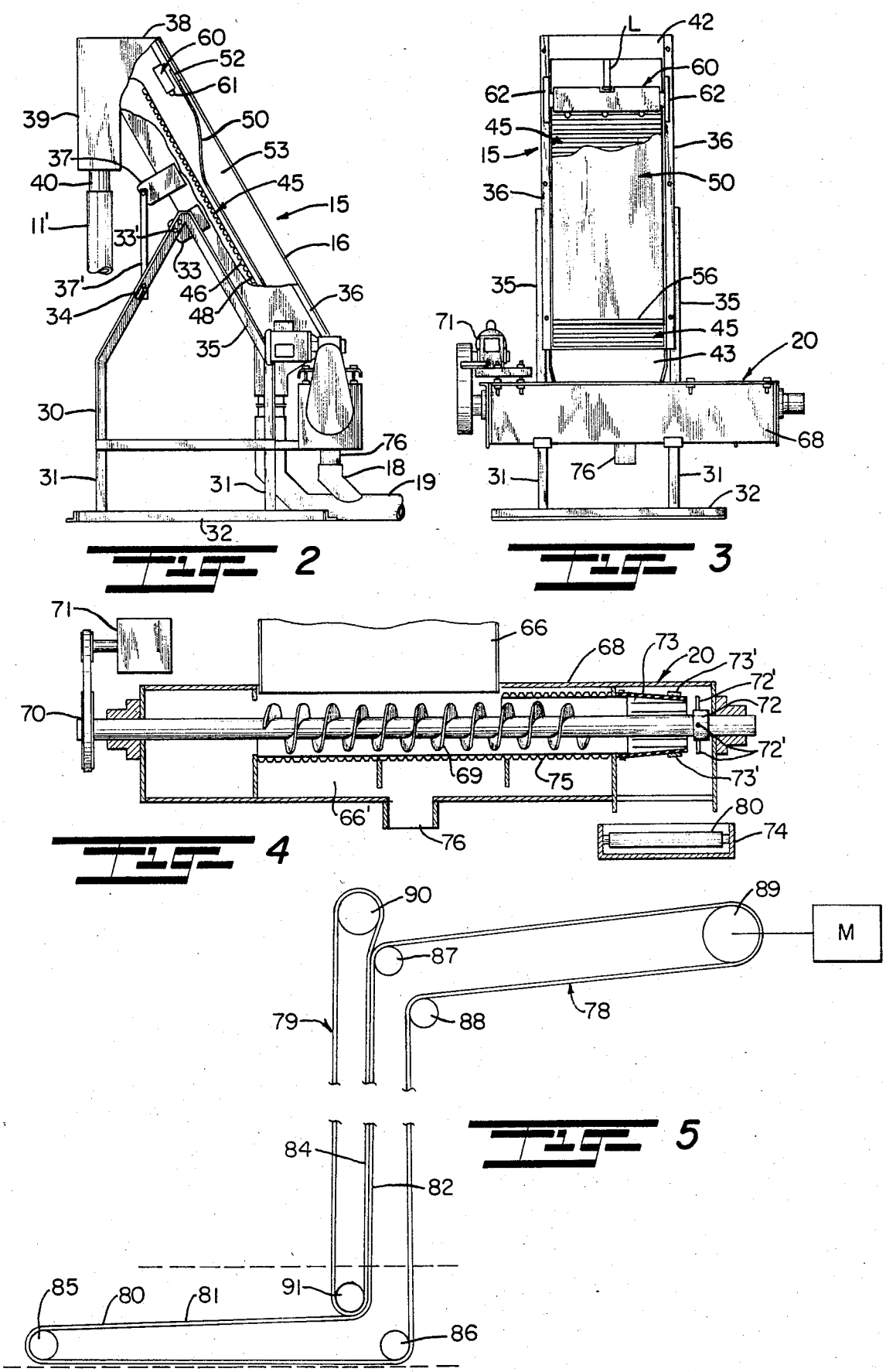

METHOD AND APPARATUS FOR RECOVERY OF USEFUL FEED VALUES FROM ANIMAL WASTE

This invention relates to a novel and improved method and apparatus for recovery of livestock feed values from animal wastes and more particularly relates to a method and apparatus for separating solids and liquids from animal wastes in such a way as to enable efficient recovery of useful animal feed supplements.

BACKGROUND AND FIELD OF THE INVENTION

I have previously devised methods and systems for maximizing the recovery of livestock feed values from animal wastes wherein the solids and liquids are separated from the wastes and treated so as to be suitable for introduction to the feed of the livestock as supplements. For example, in U.S. Pat. No. 3,982,499, there is disclosed a system in which animal wastes are flushed from a confinement feed area and initial separation of solids and liquids is performed by a screen filter. Liquids are forcibly removed from the solids by a pressure roll acting against a conveyor belt in an endless loop configuration after being filtered through a screen. The liquids thus separated are introduced to an aeration tank and combined with aerobic material and hydrolized so as to be usable for subsequent flushing of the confinement feeding area. Overflow from the aeration tank is further filtered through a wedge wire screening device and introduced to an additional aeration tank. After suitable treatment in the second aeration tank, the oxidized liquids are employed as supplements to the livestock feed water system. The solids are pressed to a predetermined moisture content and are then usable in that form as feed supplements in the animal ration.

Another closed loop system is disclosed in my U.S. Pat. No. 4,338,337 which is specifically intended for use in recycling livestock wastes into animal feed having a maximum concentration of total digestible nutrients. In that system, typically the waste material which is collected in gutters in the barns is periodically flushed into a sump or basin as a preliminary to pumping the waste materials to a separation stage. At the separator, the waste material is advanced to one end of an inclined screen having a limited mesh or opening size with the screen being inclined upwardly toward a discharge end. A shuttle-type separator suspended above the screen includes rows of scraper blades and pressure pads which cooperate in advancing the waste material across the screen and compressing the retained solids on the screen to remove a predetermined amount of moisture with a major amount of the fines from the solid waste material. The liquid so removed and a portion of the fines are then aerated and employed as a flushing agent by advancement through the gutters of the confinement facility to recover additional waste material and to carry it into an aeration tank. The solid waste material which does not pass with the liquid is separately collected and stored for subsequent use as an animal feed supplement.

Now it is proposed to provide a method of reclaiming solids for the recovery of feed supplement in a closed loop system which includes the constant harvest of high quality single cell proteins derived from the aerobic biological hydrolization of the fines which are removed by means of a compact and extremely efficient filter screen apparatus.

SUMMARY OF THE INVENTION

It is therefore an object of the present invention to provide for a novel and improved apparatus for recovering useful animal feed values from animal wastes in a reliable and efficient manner.

Another object of the present invention is to provide for a novel and improved method and means for separating solids and liquids from animal wastes in a closed confinement facility and for recovering the materials separated in the production of useful livestock feed supplements.

It is a further object of the present invention to provide for a novel and improved inclined filter screen apparatus for dynamically separating liquids from solids in animal wastes, without the use of positive mechanical pressure, by increasing the retention time of the solids on the filter screen apparatus.

It is an additional object of the present invention to provide for a compact, efficient method and means for separation of solids and liquids in animal wastes in such a way as to realize the maximum recovery of useful animal feed values in the waste material.

In accordance with the present invention, there has been devised a novel and improved separator to reclaim valuable nutrients that are not utilized or digested by livestock, the separator being broadly comprised of an inclined bed having closely spaced slots therein and means for the delivery of a mixture of liquid and solid animal waste material to an upper portion of the bed for gravity flow along the inclined surface of the bed. The slots are spaced for fluidic removal of liquid from the mixture while preventing the passage of solids therethrough. A traveling spray head is positioned over the inclined surface of the bed and is periodically advanced along the bed for the purpose of cleaning the screen surface and removing any solid particles from the slots or openings in the screen. A flexible sheet member overlies the bed and includes means suspending the upper end of the sheet member in predetermined spaced relation to the bed toward the upper portion thereof whereby to form an entrance for delivery of the mixture downwardly between the sheet member and bed and to retard the movement of the waste along the bed. The separated liquid is carried into a treatment pond, and the solid material taken off the lower discharge end of the screen is advanced into a rotary press or screw feed conveyor for removal of additional moisture if desired. A vertical conveyor delivers the solid material from the discharge end of the press into a separate storage area which may, for example, be a batch mixer where the solids are then mixed into a ration with suitable feed supplements to feed to the livestock.

In the method according to the present invention, moisture and fines are removed from animal wastes in a series of closely coordinated steps in which animal waste material from a confinement facility is conducted to the upper end of a separator unit and passes by gravity flow downwardly along an adjustable, inclined screen. The effective mesh or opening size of the screen is such as to regulate the amount of moisture withdrawn from the animal waste material and is aided by a flexible sheet disposed in overlying relation to the screen to encourage the removal of moisture or liquid from the waste while increasing the retention time of the wastes on the bed. That liquid which is removed from the waste carries with it a portion of fines from the waste for removal and are drained back into an aeration tank.

The solids from the waste material are discharged from the separator into a screw feed conveyor characterized by having an adjustable discharge to further regulate the amount of liquid removed from the waste solids and which liquid is free to pass through another screen surrounding the conveyor for drainage back to the aeration tank. The solid waste material discharged from the screw feed conveyor is vertically lifted onto another conveyor for movement into a batch mixer as described. Liquids and fines removed from the separator and screw feed conveyor are continuously aerated so as to bring about the most complete aerobic biological digestion of the fines and convert them into high quality single cell proteins which are recycled through the confinement facility and combined with additional waste material for separation in the manner described.

The above and other objects, advantages and features of the present invention will become more readily appreciated and understood when taken together with the following detailed description of a preferred embodiment of the present invention in conjunction with the accompanying drawings, in which:

BRIEF DESCRIPTION OF THE DRAWINGS

FIG. 2 is a side view in more detail of the preferred form of separator shown in FIG. 1;

FIG. 3 is a front view of the preferred form of separator illustrated in FIG. 2;

FIG. 4 is a view partially in section of a preferred form of rotary screw feed press in accordance with the present invention; and FIG. 5 is a side view of the conveyor belt employed for advancing material from the discharge end of the press into a batch mixer.

DETAILED DESCRIPTION OF THE PREFERRED EMBODIMENT

Figure 1:
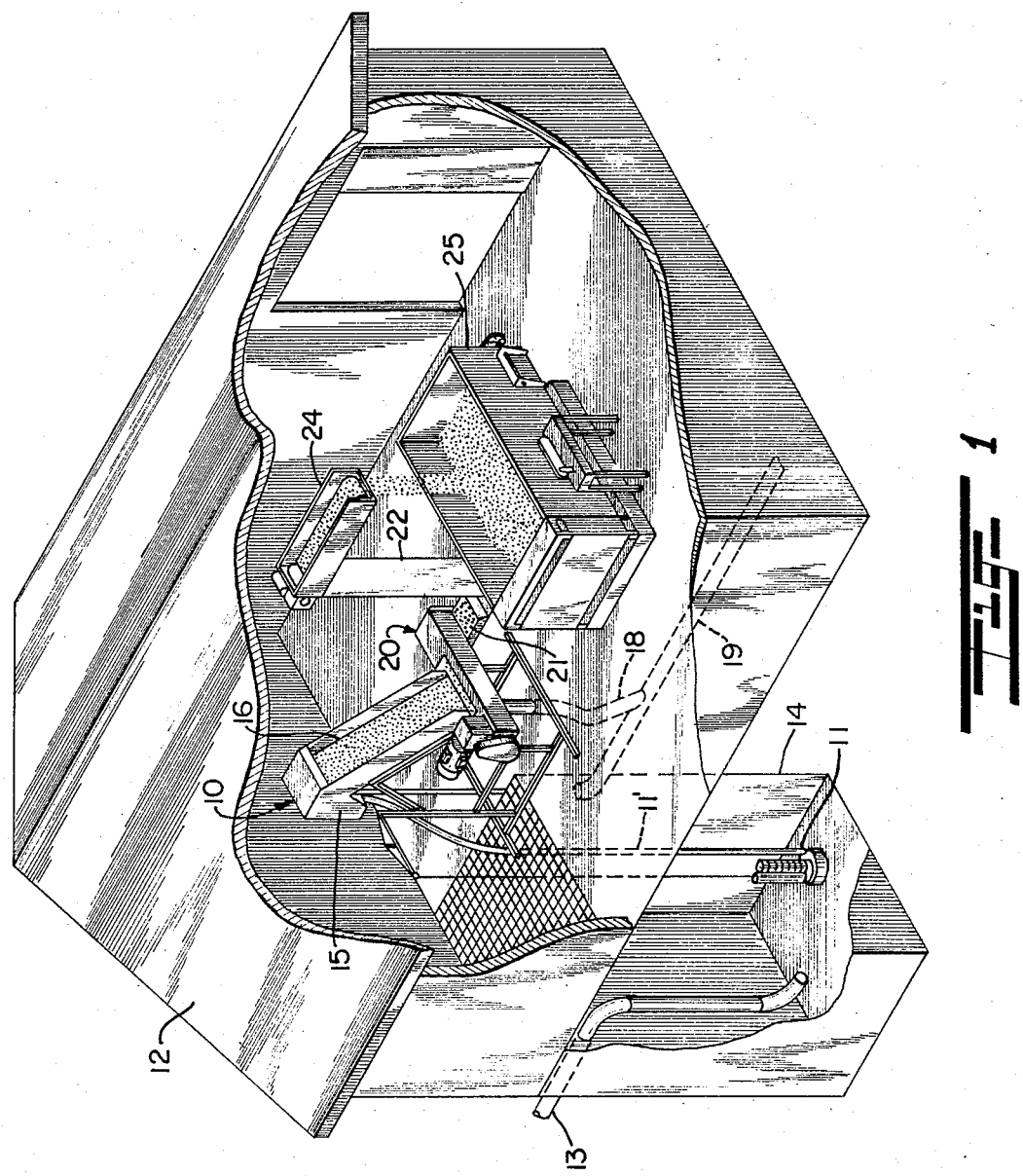
FIG. 1 is a perspective view of a confinement feed facility illustrating the preferred form of separator in accordance with the present invention.

Referring in more detail to the drawings, there is shown by way of illustrative example in FIG. 1 a solids separator system generally designated at 10 which is housed in a common enclosure 12 which may, for example, be constructed at the end of an animal barn, not shown. The effluent from the barn is conducted through a discharge pipe 13 into a collection sump 14 in which is positioned a heavy duty submersible sump pump 11 to deliver the effluent from the sump 14 through a delivery line 11' vertically into the upper end of a separator unit 15. The separator unit has an inclined bed 16 over which the effluent or waste material is directed in order to remove liquids therefrom and which liquids are drained off via pipe 18 into sump overflow 19 for delivery to a treatment pond. The solids remaining after separation of the liquids along the inclined bed are directed into a screw feed conveyor or rotary press 20 at the lower terminal end of the separator unit, the moisture content in the solids being further adjustably controlled by the rotary press in a manner to be described. The solid material then discharged as at 21 from the press are directed into a vertical conveyor unit 22 which lifts the solid material onto a horizontal conveyor 24 from which they are deposited into a batch mixer 25 where the solids are mixed with a feed supplement material; or, if desired, can merely be stored for subsequent use.

Now considering the detailed construction and arrangement of the separator unit 15, as shown in FIGS. 2 and 3, the unit is made up of an open frame 30 having spaced vertical frame members 31 extending upwardly at four corners from horizontal skids 32. The vertical frame members 21 terminate in upper inclined frames 34 and 35 of inverted V-shaped configuration and mounting brackets 33 project downwardly from opposite sides of the inclined bed 16 of the separator unit for pivotal connection as at 33' to the frames 34 and 35. Upper spaced support brackets 37 have brace members 37' secured at their lower ends in slots 34 to adjustably fix the bed 15 at the desired angle. Preferably, the bed is made up of elongated channel members 36 on opposite sides which are supported on the frame members 35 and project upwardly beyond the frame members to terminate in an upper plenum or delivery chamber 38. A downward vertical extension 39 behind the channel members 36 terminates in an inlet port 40 which is coupled to effluent delivery line 11' as shown in FIG. 1. The channel members 36 are unified into an open rectangular frame by upper and lower cross plate members 42 and 43, respectively, the cross plate members 42 and 43 each defining aprons at the upper and lower ends of the bed for movement of the solid material along a wedge wire filter screen 45. In a manner corresponding to that described in my U.S. Pat. No. 3,982,499, the wedge wire filter 45 comprises a series of wedge-shaped bars 46 extending transversely between the channel members and rigidly connected at their ends to the channel members. The bars are arranged in predetermined, closely-spaced relation to one another so as to define intervening slots 48 therebetween for removal of the liquid material by gravity flow through the slots. Preferably, the bars are approximately 3/16" in width and are separated by slots 48 which are on the order of 0.020" wide. Angular adjustment of the screen by means of the brackets 33 and 37 can operate to reduce the effective width between the slots so as to restrict the size of fines removed with the liquid. It has been found that the effective opening size can be reduced to 0.005" when the angle of the bed is set at 60° to horizontal.

As seen from FIG. 3, the greater length of the wedge wire filter is covered by a flexible sheet or drape 50 which has its upper end affixed to the channel members at 52 so as to be spaced at its upper end above wedge wire filter screen 45. Preferably, the lower end of the sheet member 50 includes a weight bar 56 which will normally hold the lower end of the sheet against the wedge wire filter bars 46 depending upon the amount of time required to drain the desired amount of liquid out of the waste material. The sheet member 50 is preferably composed of a heavy gauge plastic material which will of its own weight normally lay against the filter bars 46 but is capable of yielding under the pressure of the gravity flow of the effluent material downwardly along the upper end of the bed. In this manner, the sheet member will establish a longer retention time of the waste material on the screen and discourage any tendency of the waste material to roll over the screen. Moreover, it has been found that the close spacing between the bars will create a negative pressure to encourage the liquids to pass through the slots 48. For this reason, it has not been found essential to extend the sheet member the entire length of the filter bed 45 and liquid separation will continue along the entire length of the inclined bed as the effluent material is continuously discharged thereacross.

A traveling spray bar 60 having spray orifices 61 is mounted on slide members 62 which are supported at opposite ends by the channel members 36 for periodic longitudinal advancement along the slide members 62 to traverse the length of the filter bed for cleaning the wedge wire filter bars and removing any of the solid materials which may become trapped in the slots. The spray bar 60 may be advanced manually or by suitable drive means so as to cause it to traverse the entire length of the filter bed during interim periods when the waste material is not being discharged onto the screen. A suitable source of water under pressure L is connected into the spray bar and activated as the spray bar 60 is advanced along the screen 45.

The solid material together with any remaining liquid material in the effluent is directed downwardly across the lower apron into an upper hopper portion 66 of the rotary press 20. The rotary press comprises an elongated rectangular housing 68 in which is disposed an auger 69 having a power transmission belt 70 driven by a motor drive 71 at one end thereof. A sleeve 73 composed of rubber or rubber-like material is positioned to extend from the end of the basket 75 into the discharge area of the housing, the sleeve being notched by darts cut back from its discharge end to form a restricted or convergent opening of generally frusto-conical configuration for passage of the waste material from the auger 69. The opening size of the sleeve 73 is controlled by placing a flexible squeeze band 73' in surrounding relation to the sleeve. The discharge end of the auger 69 is provided with a multi-pronged ejector 72 keyed to the auger shaft having circumferentially spaced prongs 72' which rotate with the auger shaft to eject the material from the sleeve 73 downwardly through a discharge opening 67 at the lower end of the housing into a bin 74. Thus, the sleeve 73 will, depending upon the degree of restriction by the band 73', assist in controlling the amount of moisture removed from the solid effluent. This moisture or liquid will flow by gravity through a generally cylindrical wedge wire basket 75 in surrounding relation to the auger 69, the basket being recessed beneath the upper hopper portion 66. Any liquid squeezed from the solid effluent is removed via drain 76 in the lower end of the housing 66' into communication with the liquid drain 18 for delivery through the treatment pond as hereinbefore described.

The hopper or bin 74 includes the lower horizontal course of a conveyor belt 80 so that as the waste material is deposited onto the belt 80 it is advanced first in an upwardly inclined direction as designated at 81, then along a vertical course designated at 82 wherein it is trapped between the vertical course of the longer belt 78 and the vertical course 84 of shorter belt 79, as shown in FIG. 5. The longer conveyor belt is directed over a series of guide rollers 85, 86, 87 and 88 with a drive pulley 89 being driven by motor drive represented at M. A shorter belt 79 is in the form of an endless loop passed over upper and lower guide rollers 90 and 91, respectively, to follow the upward movement of the vertical course 82 of the longer belt 78. This is aided by mounting the guide roller 90 so as to cause the belt 79 to curve slightly over the longer belt at its upper end. In this way, the waste material is carried upwardly between the vertical courses, then is conveyed along the horizontal course of the longer belt as established between the guide roller 87, 88 and drive pulley 89 and carried along the horizontal trough section 24 into the batch mixer 25. Any moisture removed from the vertical lift conveyor is carried back to discharge drain 18 and the conduit 19 which leads to the treatment pond.

In the treatment pond, preferably a submersible air inductor assembly is utilized to continuously aerate the waste material including the liquids returned from the separator system so as to bring about the most complete aerobic digestion of the material including any fines which are carried back into the pond with the liquid. The treated liquid from the treatment pond may be employed in flushing the gutters of the barn and advancing the waste material into the sump 14 and recycled along with the effluent through the separator system.

In practice, the method and apparatus of the present invention have been found to be conformable for use in various waste treatment processes having one or more confinement facilities or barns. In the treatment of waste materials in cattle or hog barns, the system is capable of harvesting in excess of 80% of the total solids from the confinement facility. In the manner described in more detail in U.S. Pat. No. 4,338,337, the fines that do pass through the wedge wire filters in the form of single cell protein serve to enrich the feed by aerobic digestion into the flush waters returned to the barns from the treatment pond to carry additional waste material back to the separator. Typically, the waste material from the confinement facility will contain on the order of 98% liquids. In the separator stage, the moisture content will be reduced approximately to 85% liquid, and in the rotary press or feed conveyor will be further reduced to on the order of 70% liquid. These percentages may be varied according to the speed of movement of the material over the separator and the amount of pressure applied within the rotary press as hereinbefore described. The amount of moisture and fines removed along the separator stage can be further regulated by adjusting the angle of inclination of the separator so as to control the effective opening size in the screen between the bars 46. Thus, as the angle of the bed with respect to horizontal is increased, the waste material discharged across the bed will flow at a faster rate and the effective opening size will be reduced thereby resulting in a proportionally lesser amount of fines removed from the waste. In the screw feed conveyor system, axial movement of the damper 72 in a direction toward the discharge end of the auger will increase the pressure on the waste material so as to remove a greater amount of moisture from the material preliminary to its removal through the discharge end of the housing.

It is therefore to be understood that while a preferred embodiment of a method and apparatus have been herein set forth and described, various modifications and changes may be made therein without departing from the spirit and scope of the present invention as defined by the appended claims.

I claim:

1. In apparatus for separating liquids from solid animal waste material in the recovery of animal feed wherein there is provided an inclined bed having closely spaced slots therein and means for the delivery of a mixture of said liquid and solid animal waste material to an upper portion of said bed for gravitational flow along said upper portion, said slots being spaced for fluidic passage of liquid from said mixture while preventing the passage of solids therethrough, the improvement comprising:

a flexible sheet member overlying said bed including means suspending at least one end of said sheet member in closely spaced relation to said bed toward said upper portion of said bed whereby to form an entrance for gravitational flow of said mixture downwardly between said sheet member and said bed; and conveyor means for receiving said solids waste material from the lower portion of said bed.

2. In apparatus according to claim 1, said flexible sheet member including a weight bar at one end thereof opposite to said suspension means.

3. In apparatus according to claim 1, said flexible sheet member being dimensioned to traverse the greater length of said bed.

4. In apparatus according to claim 1, said conveyor means at the lower end of said bed including an inlet opening and a discharge opening, an auger member for compressing said animal waste material received from said bed, and a filter screen in partially surrounding relation to said auger.

5. In apparatus according to claim 4, said conveyor means including a conveyor belt for advancing the material upwardly from said auger.

6. In apparatus according to claim 4, said auger including adjustable control means adjacent said discharge opening to regulate the rate of flow and removal of liquid from the waste material by said auger.

7. In apparatus according to claim 6, said adjustable control means having said filter screen in surrounding relation to said auger adjacent said discharge opening, and means including a sleeve defining a convergent extension of said filter screen toward said discharge opening whereby to regulate the amount of liquid removed from the waste material.

8. In apparatus according to claim 7, said adjustable control means having ejector means rotatable with said auger to eject solid waste material passing through said sleeve into said discharge opening.

9. In apparatus for separating liquids from solid animal waste material in the recovery of useful animal feed values wherein there is provided an inclined bed having closely spaced slots therein and means for the delivery of a mixture of said liquid and solid animal waste material to an upper portion of said bed, said slots being spaced for fluidic passage of liquid from said mixture while preventing the passage of solids therethrough, the improvement comprising:

bed support means for pivotally supporting said inclined bed including means for fixing said bed at a predetermined angle of inclination to regulate the effective opening size of said slots;

a flexible sheet member overlying said bed including means suspending at least one end of said sheet member in predetermined spaced relation to the upper portion of said bed whereby to form an entrance for gravitational flow of said mixture downwardly between said sheet member and said bed; and rotary feed screw means for receiving said mixture of solids waste material and any remaining liquid from the lower portion of said bed and operative to compress said mixture whereby to separate additional liquid therefrom.

10. In apparatus according to claim 9, said flexible sheet member including a weight bar at one end thereof opposite to said suspension means, and said flexible sheet member dimensioned to traverse the substantial length of said bed.

11. In apparatus according to claim 9, said feed screw means including an auger member for compressing said animal waste material received from an inlet opening toward a discharge opening, and a wedge wire basket in spaced, surrounding relation to said auger for removal of liquid compressed from said mixture by said auger.

12. In apparatus according to claim 9, lift conveyor means for receiving said mixture discharged from said feed screw means and lifting said mixture continuously along a vertical course.

* * * * *